United States Patent
Gadamsetty et al.

(10) Patent No.: US 7,219,100 B2
(45) Date of Patent: May 15, 2007

(54) METHOD AND APPARATUS FOR DATABASE INDUCTION FOR CREATING FRAME BASED KNOWLEDGE TREE

(75) Inventors: Srikanth Gadamsetty, Nashville, TN (US); Rajesh Kommineni, Nashville, TN (US); John Russell Cook, Nashville, TN (US); Tim Howland, Nashville, TN (US)

(73) Assignee: Edgenet, Inc., Brentwood, TN (US)

( * ) Notice: Subject to any disclaimer, the term of this patent is extended or adjusted under 35 U.S.C. 154(b) by 527 days.

(21) Appl. No.: 10/727,596

(22) Filed: Dec. 5, 2003

(65) Prior Publication Data

US 2005/0125421 A1 Jun. 9, 2005

(51) Int. Cl.
*G06F 7/00* (2006.01)
*G06F 17/00* (2006.01)
(52) U.S. Cl. .............. 707/100; 707/102; 707/104.1
(58) Field of Classification Search .......... 707/3, 707/100, 101, 102, 104.1; 706/45, 47; 715/513, 715/517
See application file for complete search history.

(56) References Cited

U.S. PATENT DOCUMENTS

| | | | |
|---|---|---|---|
| 4,775,935 A | | 10/1988 | Yourick |
| 5,526,522 A | * | 6/1996 | Takeuchi ............. 717/107 |
| 5,822,206 A | * | 10/1998 | Sebastian et al. ....... 700/97 |
| 5,956,707 A | | 9/1999 | Chu |
| 6,260,048 B1 | * | 7/2001 | Carpenter et al. ........ 707/104.1 |
| 6,289,353 B1 | * | 9/2001 | Hazlehurst et al. ........ 707/102 |
| 6,336,106 B1 | | 1/2002 | Evans |
| 6,567,814 B1 | * | 5/2003 | Bankier et al. ............ 707/101 |
| 6,727,925 B1 | | 4/2004 | Bourdelais |
| 6,865,524 B1 | | 3/2005 | Shah et al. |
| 6,952,688 B1 | * | 10/2005 | Goldman et al. ............ 706/45 |
| 2002/0103777 A1 | * | 8/2002 | Zhang ................... 706/59 |
| 2003/0220949 A1 | * | 11/2003 | Witt et al. ............. 707/204 |
| 2006/0041836 A1 | * | 2/2006 | Gordon et al. ............ 715/513 |

OTHER PUBLICATIONS

Jennifer Neville, David Jensen, Lisa Friedland and Michael Hay (2003), Learning Relational Probability Trees, pp. 625-630.*

* cited by examiner

*Primary Examiner*—Don Wong
*Assistant Examiner*—Merilyn Nguyen
(74) *Attorney, Agent, or Firm*—Dickstein Shapiro LLP

(57) ABSTRACT

An automated process (and system) for facilitating the creation of a frame based knowledge tree for use with a configuration system is provided. In accordance with a preferred embodiment, a database induction module interacts with a user interface and a vendor provided database containing product information in the form of database files. The user sets induction preferences via a graphical user interface, and the induction module accesses product information from the client database files and automatically generates a frame based product knowledge tree in light of the user's preferences, where the frame based product knowledge tree is intended for use with a configuration system for configuring certain desired products, services, or other assemblages.

7 Claims, 4 Drawing Sheets

METHOD AND APPARATUS FOR DATABASE INDUCTION FOR CREATING FRAME BASED KNOWLEDGE TREE

REFERENCE TO RELATED APPLICATIONS

This application is related to U.S. patent application Ser. No. 09/684,907, filed Oct. 10, 2000, which is hereby incorporated by reference in its entirety.

BACKGROUND

The growing trend of mass customization in the manufacturing community has accentuated the importance of configuration systems. Configuration systems facilitate the configuration of desired products, services, or other assemblages that require users to gather and assimilate disparate knowledge of makes, models, types, features, options, limitations, manufacturing constraints, etc. of a desired product/service (or group of the same) to be configured. In the manufacturing sector, for example, a configuration system can reconcile the complexities involved with configuring customizable products that conform to certain known manufacturing constraints. Through the use of configuration systems, a user can identify any potential manufacturing problems prior to the expenditure of funds.

Typically, configuration is facilitated through interaction by a user, via a user interface, with an inference engine that performs, for example, frame-based inferences to discern product knowledge stored in a knowledge base. The creation of the knowledge base containing the disparate product knowledge involves acquiring the product knowledge from numerous sources and encoding that knowledge using graphical user interface (GUI) tools.

Such GUI tools allow the user (typically, a knowledge engineer) to model the product knowledge in a tree like structure where each node of the tree is known as a frame. The attributes that describe and specialize the frame are represented using slots. The node at each level in a tree inherits properties from its parent node(s) and allows the user to override, extend or specialize these properties at the current level. The level in a tree at which certain attributes are placed depends on the generality of those attributes. For example, attributes that are common to a number of configurable items are placed closer to the top of the tree. Attributes that specialize a configurable item are placed at the lower levels of the tree. This process of creating a frame based knowledge tree is called the product knowledge design process and is implemented by knowledge engineers.

Typically, the process of creating a frame based knowledge tree includes the creation of product information files by acquiring the product knowledge from various product experts. These experts can include pricing experts, manufacturing process experts, product specification experts, customer service experts, etc. The process of amassing the disparate product knowledge, organizing that knowledge in some predetermined hierarchical system, and creating a frame based knowledge tree is very time consuming, cost intensive and requires the coordination of several individuals.

SUMMARY

A method for and apparatus for facilitating the creation of a frame based knowledge tree for use with a configuration system is provided. In accordance with a preferred embodiment, a database induction module interacts with a user interface and a customer-provided product database containing product information. The user sets induction preferences via the GUI, and the induction module accesses product information from the client database files and automatically generates a frame based knowledge tree in light of the user's preferences.

DETAILED DESCRIPTION

Preferred embodiments and applications of the invention will be described herein. Other embodiments may be realized and structural or logical changes may be made to the embodiments without departing from the spirit or scope of the invention. Although certain embodiments disclosed herein have been particularly described as applied to a knowledge base for specific exemplary products (e.g., plumbing supplies), it should be readily apparent that the invention may be embodied to create a knowledge base for any number of products, services or the like.

In accordance with a preferred embodiment of the invention, a database induction process for creating a frame based knowledge tree is implemented using a processor-based system that may be supported in a stand-alone, networked, mainframe, or client-server architecture. A single (or multiple) program memory module is provided for storing one or more computer programs used to perform the functionality described herein.

In accordance with a preferred embodiment, one or more user interfaces are provided as part of (or in conjunction with) the database induction process to permit users to interact with one or more vendor databases and also with an induction module. Individual ones of a plurality of client devices (e.g., network/stand-alone computers, personal digital assistants (PDAs), WebTV (or other Internet-only) terminals, set-top boxes, cellular/PCS phones, screenphones, pagers, kiosks, or other known (wired or wireless) communication devices, etc.) may similarly be used to execute one or more computer programs (e.g., universal Internet browser programs, dedicated interface programs, etc.) to allow users to interface with the vendor databases and the induction module.

In accordance with a preferred embodiment, a user (e.g., knowledge engineer, etc.) of the database induction process interacts with the system to create a frame based knowledge tree. The interaction with the system is preferably through a series of questions provided by the system with input answers provided by the user. The system may, however, support a variety of other methods of interaction (e.g., command driven, menu driven, script, etc.)

Figure 1:
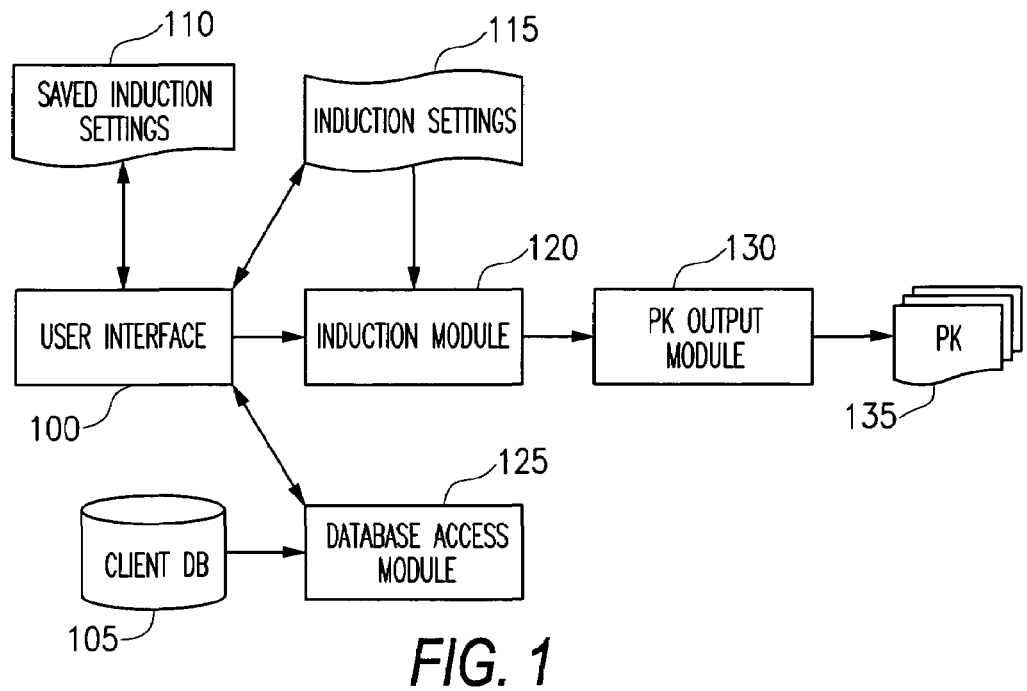
FIG. 1 is a block diagram illustrating a database induction system in accordance with a preferred embodiment of the invention.

FIG. 1 illustrates in block diagram form, a database induction system (and preferred apparatus for performing a process) in accordance with a preferred embodiment of the invention. The system preferably contains a user interface 100 for enabling the user to interact with an induction module 120, in accordance with induction settings 115 specified by the user, and also for interacting with a database access module 125 enabling the system to access a client database 105. In accordance with a preferred embodiment, the induction settings are also stored in memory (not shown) by the interface 100 as saved induction settings 110 for future use.

The database access module 125 interacts with the vendor database 105 to receive the disparate product knowledge that is to be inducted in the generated knowledge tree. The induction module 120 is preferably coupled to the product knowledge output module 130, where the generated knowledge tree is configured as product knowledge files for use, for example, with a product configuration system.

In accordance with a preferred embodiment, the vendor of the product(s) to be configured provides the user (e.g., the knowledge engineer) with at least one database table representing specific information about the product(s) (e.g., plumbing supplies). Below, four such database tables (TABLES 1–4) are described; however, the first table (TABLE 1) contains the data that is essential to the construction of the knowledge tree. Further, the vendor need not actively provide the database table(s) to the user, but, rather, the vendor need only make the underlying data for the table(s) available to the user via the client database 105.

With reference to TABLE 1, a data table is depicted as containing product catalog data (e.g., product specifications) for a given category of product where each column represents a different attribute (e.g., diameter, length, material, finish, etc.) for the category of product (e.g., pipes), and where each row in the table describes up to four different attribute values such that each row describes a different product. If a certain product attribute is not applicable for a certain product, the attribute value is left blank. While TABLE 1 depicts product data for three different products, it should be readily understood that many more rows and/or columns may be used to describe as many different product attributes and attribute values as are necessary for a given product category. Further, in accordance with a preferred embodiment of the invention, the user may update such data tables representing a vendor's single product line and/or multiple product lines.

TABLE 1

Data Table

| Product Attribute 1 | Product Attribute 2 | Product Attribute 3 | Product Attribute 4 |
|---|---|---|---|
| Attribute Value 1 | Attribute Value 12 | Attribute Value 13 | Attribute Value 14 |
| Attribute Value 2 | Attribute Value 22 | Attribute Value 23 | Attribute Value 24 |
| Attribute Value 3 | Attribute Value 32 | Attribute Value 33 | Attribute Value 34 |

With reference to TABLE 2, a frame table is depicted as maintaining items of similar type made by multiple vendors or multiple product lines from the same vendor. This table can be generated by the user to force all vendors of a particular product category (e.g., pipes, valves, etc.) to have the same top-level attributes (e.g., diameter, material, length, finish, etc.) for their respective products. The frame table can also be generated by the vendors who each have multiple product lines and want all the product lines to have common top level attributes (e.g., where such products are standardized in the given industry).

TABLE 2

Frame Table

| UNIQUE ID | Product Category 1 | Product Category 2 | Table Name |
|---|---|---|---|
| 1 | Category 1 | Category 12 | Product-table-1 |
| 2 | Category 2 | Category 22 | Product-table-2 |
| 3 | Category 3 | Category 32 | Product-table-3 |

Each row of the frame table, for example, is assigned a unique identification and is associated with a different product category and also with a different product data table (e.g., such as TABLE 1) containing a unique set of product attributes and values for the associated product category. The columns labeled Product Category 1 and Product Category 2 can represent the same category of product as supplied by two different vendors or different categories by the same vendor. The two product categories of row 1, for example, although supplied by two different vendors, may have common attributes as listed on Product-table-1. Of course, the frame table may have as many rows and/or columns as are necessary for a given application. Further, in accordance with a preferred embodiment of the invention, the user may update the frame table product lines (e.g., as vendors change).

With reference to TABLE 3, a question repository table is depicted. The question repository table contains a list of questions generally asked in a particular industry to describe a certain product in a given product category. The underlying data for the question repository table is supplied by the vendor since the vendor is most familiar with the specific questions a customer will ask in order to arrive at a specific product. In addition, the vendor may choose to add or delete questions as required to describe their product differently. Each row contains a separate question, where the Question ID column contains the unique value by which the question is identified. Further, the Question Title, Question Description and Question Prompt headings are self-explanatory and respectively describe those other attributes of a particular question.

Figure 2:
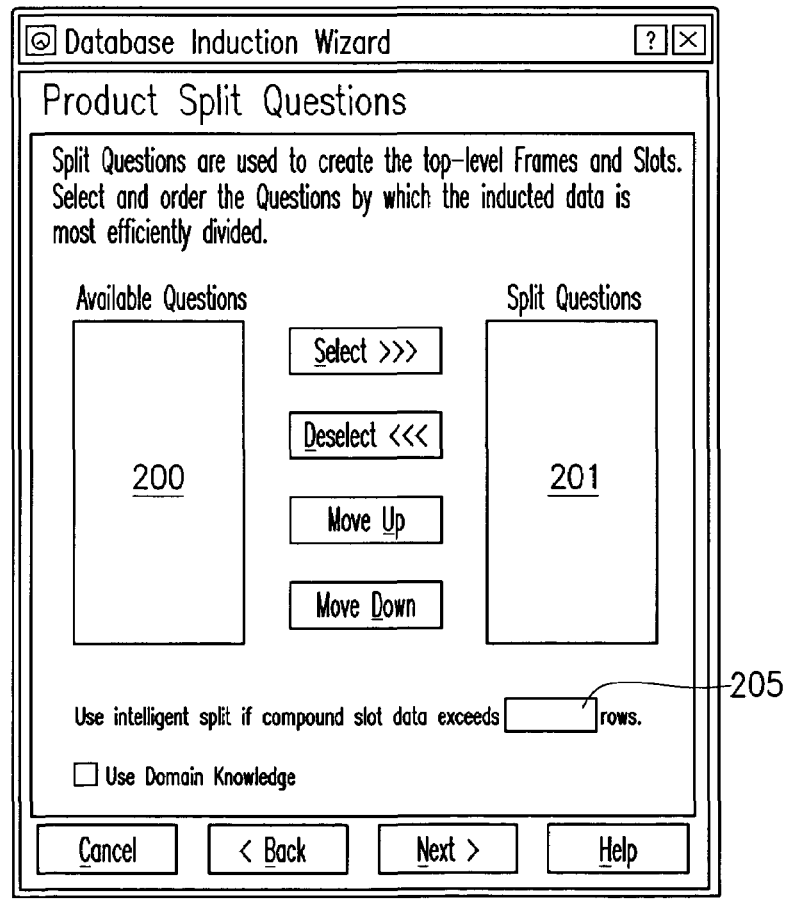
FIG. 2 is a screen shot of an exemplary graphical user interface used in the FIG. 1 database induction system in accordance with a preferred embodiment of the invention.

FIG. 2 illustrates a typical screen shot of a user interface 100 implemented with a graphical user interface (GUI). The questions addressing product attributes to be included on the knowledge tree, which are stored by the question repository table, appear in display portions 200 of the GUI in order to prompt the knowledge engineer during interactive knowledge tree construction, as will be described more fully below.

TABLE 3

Question Repository Table

| UNIQUE ID | Question ID | Question Title | Question Description | Question Prompt |
|---|---|---|---|---|
| 1 | CATEGORY | Category | This column contains the question category | Please select your category |

With reference to TABLE 4, a question linking table is depicted as containing references to the frame table (TABLE 2), the question repository table (TABLE 3), and the product data table (TABLE 1). The underlying data for this table, as with TABLES 1–3, is preferably provided by the vendor in order to facilitate the creation of the frame based knowledge tree; however, this table is not necessary to practice this illustrated embodiment of the invention. In fact, the only table necessary for practicing the illustrated embodiment of the invention is TABLE 1, the product data table. TABLES 2–4 facilitate the process of automatic knowledge tree construction but are not absolutely necessary to do so. Further, with regard to the product data table, the product data need not be presented in a single database table in order to practice this illustrated embodiment of the invention, but rather, the product data may be in the form of a plurality of database tables made accessible by the vendor, or in a plurality of tables that follow a relational schema.

TABLE 4

Question Linking Table

| UNIQUE ID | Frame-table-id | Question-table-unique id | Column-name/Column-id |
|---|---|---|---|
| 1 | 1 | 1 | Product Attribute 1 |

Referring back to FIG. 1, the induction module 120 receives the product information from the vendor's database 105, including the information depicted above at TABLES 1–4, via database access module 125. In one embodiment, an interactive (i.e., manual) knowledge tree construction may be utilized, where the user interface 100 prompts the user with a series of questions requiring the user to select from a list of product attributes, the answers to which determine the order, and manner in which the attributes are added to the frame based knowledge tree. In another embodiment, automatic construction (described below) may be utilized, where the process of knowledge tree construction is automatic based on user specified generalization and optimization criteria.

Referring again to FIG. 2, an exemplary screen shot of a GUI is depicted in accordance with a preferred embodiment of the invention. The user may set his preferences, including generalization and optimization criteria, via the FIG. 2 GUI. One example of a user preference may be the number of rows in a compound slot. The user is presented with a series of screens for completing the optimization process. In the series of screens, the user reviews the database tables present in the vendor's database and selects those database tables required for the database induction process (e.g., TABLES 1–4) of the product(s) of interest.

Once the system has identified the necessary database tables for interactive construction, the user is presented with a list of product attributes (e.g., diameter, material, length, finish, etc.). For more simple projects, a knowledgeable user can interactively construct the knowledge tree based on the product attributes by selecting them in the order with which they are to be added to the knowledge tree. For more complex projects, the user may let the system construct the knowledge tree automatically based on the product data table(s) or can do a combination of both. For example, with reference to FIG. 2, the user may specify at portion 205 a threshold number of rows in a compound slot based on which the induction module 120 shifts from interactive to automatic knowledge tree construction.

For interactively constructing the tree, the user selects the attributes from an attribute list displayed in the user interface at display portions 200, 201. Each attribute selected by the user serves to further split the knowledge tree into separate nodes, where each node may be further split into additional nodes. The following SQL query may be used to display the attribute list at display portions 200, 205:

"SELECT QUESTIONID FROM QUESTION_REPOSITORY-TABLE WHERE FRAME-TABLE.PKTABLENAME=USER_DEFINED_TABLE AND QUESTION_LINKING_TABLE.FRAME-TABLE-ID=FRAME_TABLE.UNIQUE_ID AND QUESTION_LINKING_TABLE.UNIQUE_ID= QUESTION_REPOSITORYTABLE.UNIQUE_ID."

It should be readily apparent that the SQL query is generic and may be tailored to a specific application and for specific database names.

Figure 6:
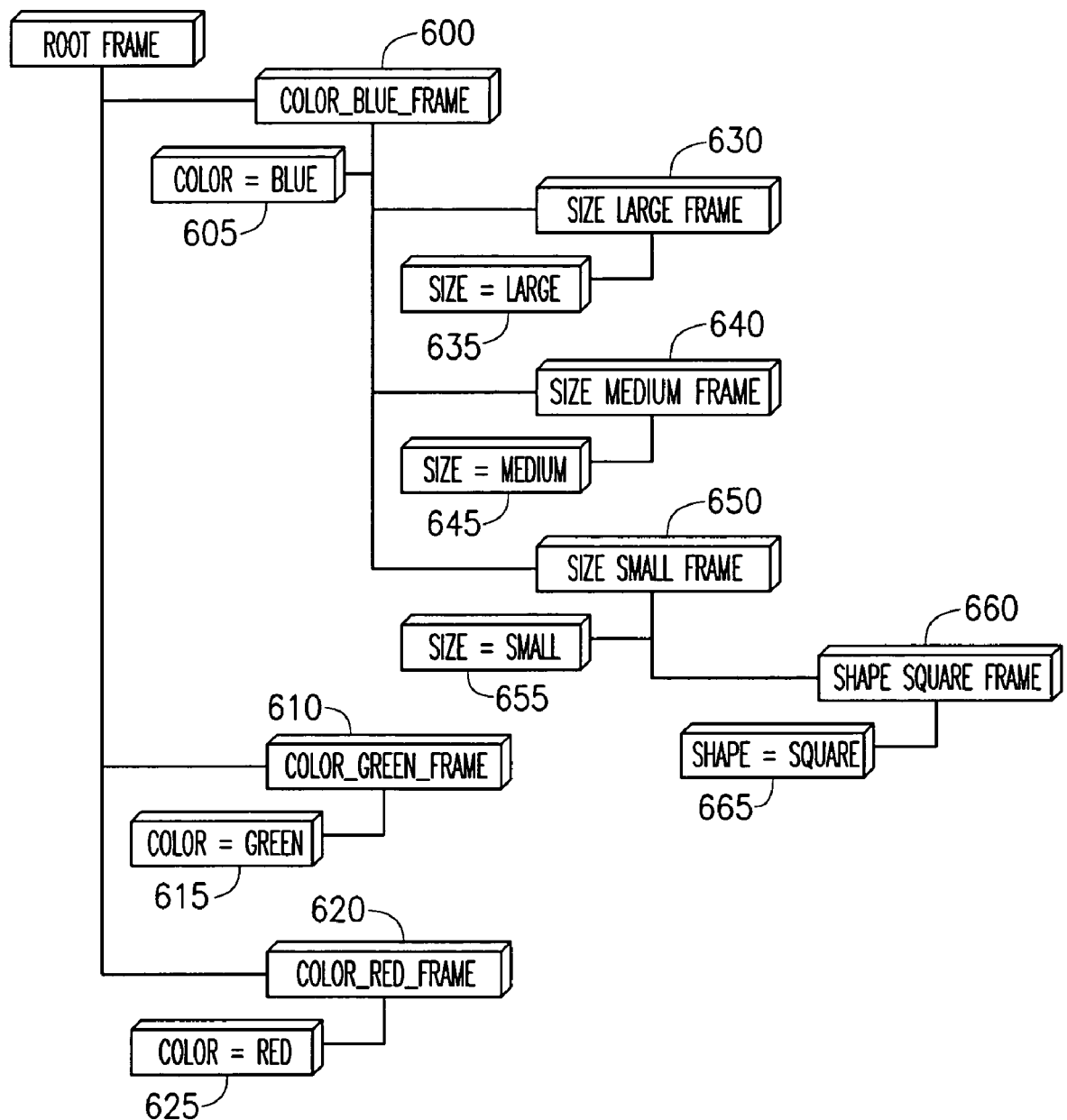
FIG. 6 is an exemplary illustration of a frame based knowledge tree constructed in accordance with a preferred embodiment of the invention.

For each attribute selected by the user, the induction module 120 queries the vendor database tables for unique values associated with that attribute. For example, where the attribute is color, unique values may be blue, red and green. In another example, where the attribute is shape, the unique values may be circle, square, rectangle, etc. The unique value dataset for each attribute forms the branches of the resultant knowledge tree (e.g., as depicted at FIG. 6 below).

Preferably, in the case of automatic frame tree construction, the induction module 120 (as opposed to the user in the interactive construction) determines the order in which the attributes appear in the knowledge tree. For determining the order, the induction module 120 uses the following generalization and optimization heuristics: 1) domain knowledge; and 2) count of distinct attribute values.

Figure 4:
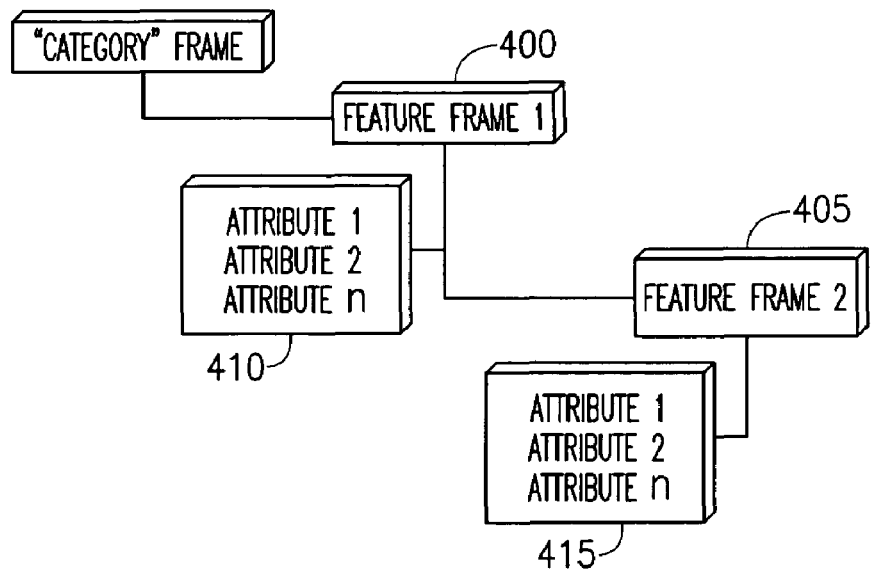
FIG. 4 is an exemplary illustration of a frame tree of domain knowledge specifications in accordance with a preferred embodiment of the invention.

The domain knowledge heuristic is premised on the fact that for a given product or product type, any number of vendors within a given domain will have the same attributes for the same type of product. For example, where the product type is pipes, it is known in the art of plumbing supplies that many vendors will have identified a given pipe at least by diameter and material. In this example, diameter and material are used to split the tree twice. Therefore, at least the first two nodes of the knowledge tree may be pre-specified based on the domain knowledge. FIG. 4 depicts a default frame tree construction for a domain knowledge specification. In this example, there are two nodes 400, 405 (feature frame 1, feature frame 2) where each node is an attribute of the product. Each attribute further respectively includes a plurality of unique values 410, 415. Of course, the domain knowledge approach may be used to pre-specify any number of attributes common to a given type of product. The construction of any additional nodes on the knowledge tree beyond the domain knowledge specification may be carried out, for example, by the induction module 120.

The count of distinct attribute values option allows the user to specify the number of distinct values used for determining the level at which the attribute appears in the knowledge tree. For example, the user may specify that any attribute having greater than five unique values should be located near the top of the knowledge tree, or, conversely, perhaps such an attribute should be included near the bottom of the knowledge tree. Further, the user has the ability to combine domain knowledge with count of distinct attribute values. If the user selects this option, whenever a conflict exists between the two, the domain knowledge takes precedence over count of distinct attribute values. A (user-changeable) default value is set for the count of distinct attribute values. The following SQL query may be used to determine the count of distinct values:

"SELECT COLUMN_NAME FROM ATTRIBUTE TABLE GROUP BY COLUMN_NAME."

Still referring to automatic knowledge tree construction, based on the user specified criteria, the induction module 120 parses through the vendor's database tables to induct the attributes that fall under each of the frame nodes. As described above, the induction module 120 uses the above-described generalization and optimization heuristics to determine which of the attributes need to be inducted at or near the top of the tree and which attributes fall towards the bottom.

Figure 3:
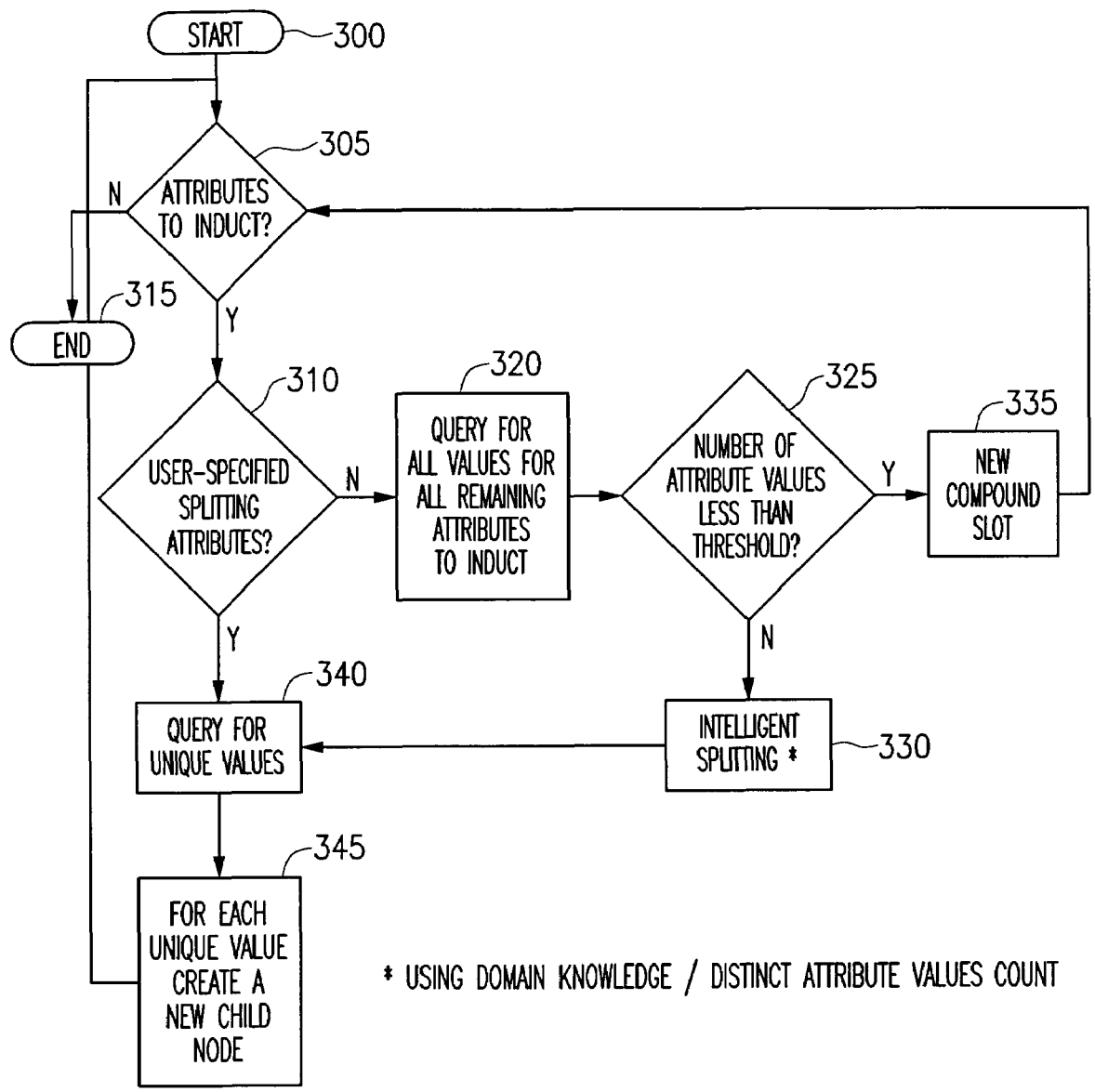
FIG. 3 is an exemplary illustration of a flowchart depicting an operational flow of the FIG. 1 database induction system in accordance with a preferred embodiment of the invention.

FIG. 3 illustrates a method or process in accordance with a preferred embodiment of the invention. The process may be performed by any of a variety of apparatuses or systems. For convenience, the process will be described as being performed by the database induction system illustrated in FIG. 1, in accordance with a preferred embodiment of the invention. The process begins at segment 300 and at segment 305, the induction module 120 determines whether there are any attributes to induct from the vendor's database tables. If there are none, the process ends at segment 315. However, if the induction module 120 determines there are attributes to induct (e.g., the database tables have not yet been exhausted of attributes), then at segment 310, the induction module 120 determines whether the user has specified any splitting attributes, such as, for example, in connection with interactive frame tree construction. If the user has specified splitting attributes, then the module 120 queries the vendor's database tables for unique values associated with that new node at segment 340. At segment 345, for each unique value found in the database tables, the module 120 creates a new child node and the process returns to segment 305.

In accordance with a preferred embodiment, the knowledge tree may be made up of several nodes where each node is represented by a frame. Each frame contains a set of attributes that specializes the frame. Each frame may also have any number (e.g., 0, 1, 2, 3, etc.) of child frames. The attributes for each frame are called "slots." There are three different types of slots.

A first type of slot is known as a "single slot." A single slot contains a single attribute and one or more values (e.g., diameter, and ½ inch, ¾ inch, 1 inch). This value(s)-attribute pair specializes the frame.

A second type of slot is a "compound slot." A compound slot is used to specialize a frame with attributes that depend on each other. The compound slot contains two or more dependent attributes and combinations of values of these attributes that would define a valid configuration.

A third type of slot is a "conditional slot." A conditional slot is used to decide which of several frame sub-trees to include in the configuration. The conditional slots are designed based on the value of the conditional attribute.

If at segment 310, it is determined that there are no user-specified attributes to be added, then at segment 320, the induction module 120 queries the vendor's database tables for all remaining attributes to be inducted. The induction module 120 then determines, at segment 325, whether the number of attributes remaining is less than a pre-specified threshold number. If the number is less than the threshold, then a compound slot is created at segment 335, and the process returns to segment 305.

If it is determined at segment 325 that the number of attributes remaining is not less than the pre-specified threshold number, then the induction module 120 conducts automatic splitting based on the generalization and optimization heuristics described above (i.e., domain knowledge, count of distinct attribute values, or a combination of both). The induction module 120 then queries the vendor's database tables for unique values at segment 340 and creates a new node for each such unique value at segment 345.

Figure 5:
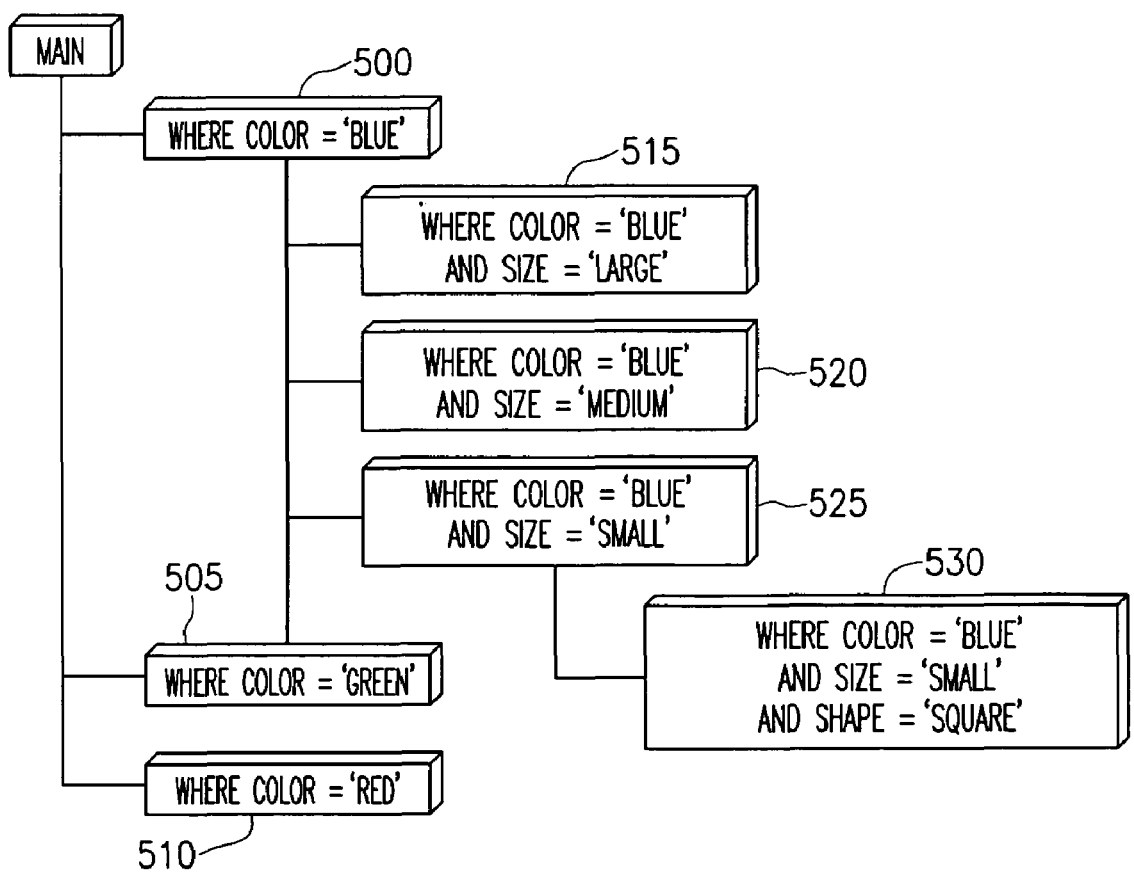
FIG. 5 is an exemplary illustration of a frame tree constructed based on responses to SQL queries run during generation of a frame based knowledge tree in accordance with a preferred embodiment of the invention.

An exemplary implementation of a database induction process in accordance with a preferred embodiment of the invention is explained in greater detail below in connection with TABLES 1A–4A, and also in connection with FIGS. 5 and 6. TABLES 1A–4A respectively depict a product data table, a frame table, a question repository table, and a question linking table, each containing exemplary vendor data.

TABLE 1A is an exemplary product data table that contains specific product data for eight different products. Each row defines a separate product. Each of the eight products have features that fall under the same three attributes. In this example, the first attribute is color, the second attribute is size and the third attribute is shape. For example, the first product listed is red, is small and is in the shape of a circle. The second product listed is blue, is small and is in the shape of a square, and so on.

TABLE 1A

Product Data Table

| Product-Attribute1 | Product-Attribute2 | Product-Attribute3 |
|---|---|---|
| Red | Small | Circle |
| Blue | Small | Square |
| Green | Small | Rectangle |
| Red | Medium | Circle |
| Blue | Medium | Rectangle |
| Red | Large | Circle |
| Blue | Large | Rectangle |
| Green | Large | Square |

TABLE 2A is a frame table, which as described above, maintains items of similar type made by multiple vendors or multiple categories by the same vendor. In this example, however, only one such vendor is listed where the product data table is identified as being Product-table-1 (i.e., TABLE 1A).

TABLE 2A

Frame Table

| Unique ID | Product-Category1 | Table Name |
|---|---|---|
| 1 | Widgets1 | Product-table-1 |

TABLE 3A depicts a question repository table as containing all of the questions that are generally asked in a particular industry to describe a certain product. In this example, three such questions are asked, one addressing a different attribute of the product (i.e., Color, Size and Shape).

TABLE 3A

Question Repository Table

| Unique ID | Question ID | Question Title | Question Description | Question Prompt |
|---|---|---|---|---|
| 1 | COLOR | Color | Contains Color | Please select your color |
| 2 | SIZE | Size | Contains Size | Please select your size |
| 3 | SHAPE | Shape | Contains Shape | Please select your shape |

TABLE 4A depicts an exemplary question linking table as containing references to the frame table (TABLE 2A), the question repository table (TABLE 3A), and the product data table (TABLE 1A). TABLE 4A also contains a column that refers to the specific Attribute of the product data table that is associated with each respective question.

TABLE 4A

Question Linking Table

| Unique ID | Frame-table-id | Question-table-id | Column-name/Column-id |
|---|---|---|---|
| 1 | 1 | 1 | Product-Attribute1 |
| 2 | 1 | 2 | Product-Attribute2 |
| 3 | 1 | 3 | Product-Attribute3 |

In accordance with a preferred embodiment of the invention, the induction module 120 parses through the vendor's database tables and identifies the set of SQL queries that require responses in order for the frame based knowledge tree to be constructed. With reference to FIG. 5, an exemplary frame tree is depicted. The frame tree is made up of SQL queries that need to be run in order to organize the data from the vendor's database tables into an automatically constructed product knowledge tree (e.g., such as is depicted below at FIG. 6).

Referring back to the exemplary product data table (TABLE 1A), one attribute of the product is color, where there are three unique values for that attribute (i.e., Blue, Green and Red). Nodes 500, 505 and 510 exemplify the respective responses to the SQL queries regarding the product color.

Referring back to TABLE 1A, a second attribute of the product is size, where there are three unique values for that attribute (i.e., Large, Medium and Small). Child nodes of node 500 are depicted as nodes 515, 520 and 525, where each of these nodes address the question of the product's size. Each of nodes 515, 520 and 525 inherit all attributes of the parent node 500.

Referring back to TABLE 1A, a third attribute of the product is shape, where there is only one possible unique value for shape where the color is blue and the size is small; that shape is square. A child node of node 525 is depicted as node 530, where this node addresses the question of product shape. Node 530 inherits all attributes from parent nodes 525 and 500; therefore, node 530 already addresses the attributes of color and size.

Referring now to FIG. 6, an exemplary frame based knowledge tree is depicted in accordance with a preferred embodiment of the invention. Once all relevant attributes from the vendor's database tables (e.g., TABLES 1A–4A) have been inducted by the induction module 102 (of FIG. 1) either interactively or automatically, the FIG. 6 knowledge tree is the end result. The particular construction of the knowledge tree can change from that depicted in FIG. 6 based on the specific preferences entered by the user (e.g., at the FIG. 2 GUI), including whether the user selects interactive construction or automatic construction; and for automatic construction, whether the user selects the domain knowledge or the distinct attribute values count heuristic approach.

As depicted in FIG. 6, and with reference to TABLE 1A, the products are identified according to three distinct attributes; color, size and shape, where each of these attributes is respectively represented by nodes of the knowledge tree. For example, the color attribute contains three distinct values; blue, red and green, where each value is represented by a separate node 600, 610, 620. Slots 605, 615 and 625 are respectively associated with nodes 600, 610 and 620 and define the unique value of the associated node.

In the case of the interactive creation of the knowledge tree, the user's response to the prompt regarding the color attribute, that appears at screen 200 of the FIG. 2 GUI, splits the knowledge tree into three different frames 600, 610 and 620, off of the root frame. In the case of automatic creation of the knowledge tree, the induction module 102 identifies the three different values for the color attribute and automatically splits the knowledge tree without further input from the user.

Still referring to FIG. 6, there are three child nodes 630, 640, 650 of node 600. Each of the nodes 630, 640, 650 inherits all attributes of the parent node 600. Accordingly, in this example, each of nodes 630, 640, 650 has the attribute color blue. The nodes respectively contain additional attributes to size, where node 630 contains attributes blue and large, and where node 640 contains attributes blue and medium, and where node 650 contains attributes blue and small. Further, slots 635, 645 and 655 respectively define the values of the attributes of nodes 630, 640 and 650.

Still further, node 650 contains one child node 660 which inherits all attributes of its parent nodes 650, 600. Accordingly, in this example, node 660 has the attribute color blue and the attribute size small and the attribute shape square. Slot 665 defines the value of node 660. The same process is followed to complete the construction of frame 600 as well as for the other two frames 610, 620.

Once the FIG. 6 knowledge tree is constructed, the product knowledge output module 130 converts the frame based knowledge tree to product knowledge files for use with a configuration system, as is known in the art.

The modules described herein (e.g., 120, 125, 130) particularly those illustrated or inherent in the instant disclosure, may be one or more hardware, software, or hybrid components residing in (or distributed among) one or more local or remote computer systems. Although the modules are shown or described as physically separated components, it should be readily apparent that the modules may be combined or further separated into a variety of different components, sharing different resources (including processing units, memory, clock devices, software routines, etc.) as required for the particular implementation of the embodiments disclosed herein. Indeed, even a single general purpose computer executing a computer program stored on an article of manufacture (e.g., recording medium) to produce the functionality and any other memory devices referred to herein may be utilized to implement the illustrated embodiments. User interface devices may be any device used to input and/or output information. The user interface device may be implemented as a GUI containing a display or the like (such as, e.g., FIG. 2), or may be a link to other user input/output devices known in the art. Discrete functionality of the system may be separated (logically or physically) to more efficiently operate the system.

In addition, memory units described herein may be any one or more known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a processor, or shared with one or more of the other components. The computer programs or algorithms described herein may easily be configured as one or more hardware modules, and the hardware modules shown may easily be configured as one or more software modules without departing from the invention. Accordingly, the invention is not limited by the foregoing description, drawings, or specific examples enumerated herein.

What is claimed as new and desired to be protected by Letters Patent of the United States is:

1. A data processing method for use in a data processing system including an user interface, the method comprising: accessing data from a database; receiving input through said user interface from a user regarding said data;
   automatically constructing a frame based knowledge tree from said data in response to said act of receiving; and
      determining an absence of user-specified attributes; querying said data for all remaining attributes yet to be inducted into said knowledge tree; determining whether the quantity of said remaining attributes exceeds a predetermined number; and inducing said remaining attributes based on whether said quantity exceeds said predetermined number;
      wherein said act of constructing comprises: identifying at least one product attribute in said data; identifying at least one unique attribute value associated with said at least one product attributes; and creating a new node of said knowledge tree for each unique attribute value identified.

2. The method of claim 1, further comprising: determining said quantity of remaining attributes does not exceed said predetermined number; and adding a new compound slot to said frame based knowledge tree including at least two of said remaining attributes.

3. The method of claim 1, further comprising: determining said quantity of remaining attributes does exceed said predetermined number; and processing said remaining attributes using at least one of domain knowledge and distinct attribute values count.

4. The method of claim 1, wherein said act of accessing comprises: accessing a vendor database table containing product data for a product.

5. The method of claim 1, wherein said act of accessing comprises: accessing a plurality of tables following a relational schema.

6. The method of claim 1, wherein said act of receiving comprises: receiving user preferences regarding construction of said frame based knowledge tree via a user interface.

7. The method of claim 1, further comprising:
   identifying at least one user-specified attribute to be inducted into said knowledge tree; and querying said data for at least one unique attribute value associated with said user-specified attribute.

* * * * *